US012786430B2

(12) United States Patent
Zhang et al.

(10) Patent No.: US 12,786,430 B2
(45) Date of Patent: Nov. 3, 2026

(54) METHOD AND APPARATUS FOR PROCESSING VIDEO CODING, ELECTRONIC DEVICE, AND STORAGE MEDIUM

(71) Applicant: Beijing Baidu Netcom Science Technology Co., Ltd., Beijing (CN)

(72) Inventors: Jiaojiao Zhang, Beijing (CN); Ke Lin, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 49 days.

(21) Appl. No.: 18/749,114

(22) Filed: Jun. 20, 2024

(65) Prior Publication Data

US 2025/0126276 A1 Apr. 17, 2025

(30) Foreign Application Priority Data

Oct. 16, 2023 (CN) ......................... 202311337438.4

(51) Int. Cl.

*H04N 19/167* (2014.01)
*H04N 19/103* (2014.01)
(Continued)

(52) U.S. Cl.

CPC ......... *H04N 19/167* (2014.11); *H04N 19/103* (2014.11); *H04N 19/124* (2014.11);
(Continued)

(58) Field of Classification Search

CPC ............. G06T 7/11; G06T 2207/20021; G06T 2207/10016; G06T 7/194; G06T 7/246;
(Continued)

(56) References Cited

U.S. PATENT DOCUMENTS

2006/0008147 A1* 1/2006 Jung .................. G06V 30/1444 382/176
2016/0014421 A1* 1/2016 Cote ...................... H04N 19/14 382/170
2019/0114486 A1* 4/2019 Wang .................. H04N 21/488

FOREIGN PATENT DOCUMENTS

CN 102754440 A 10/2012
CN 103974071 A 8/2014
(Continued)

OTHER PUBLICATIONS

Aug. 27, 2024—(CN) First Office Action—App. No. 202311337438.4 w/English Translation.

(Continued)

*Primary Examiner* — Farhan Mahmud
(74) *Attorney, Agent, or Firm* — Banner & Witcoff, Ltd.

(57) ABSTRACT

Provided is a method for processing video coding. The method includes: according to domain image blocks of a target image block in a video frame, determining whether the target image block belongs to a candidate caption region; in response to determining that the target image block belongs to the candidate caption region, generating a pixel histogram of the target image block; according to the pixel histogram of the target image block, determining a region type to which the target image block belongs, where the region type is a caption region or a non-caption region; and according to the region type to which the target image block belongs, determining a target coding mode for the target image block.

14 Claims, 5 Drawing Sheets

(51) Int. Cl.
*H04N 19/124* (2014.01)
*H04N 19/132* (2014.01)
*H04N 19/136* (2014.01)
*H04N 19/176* (2014.01)
*H04N 19/593* (2014.01)

(52) U.S. Cl.
CPC ......... *H04N 19/132* (2014.11); *H04N 19/136* (2014.11); *H04N 19/176* (2014.11); *H04N 19/593* (2014.11)

(58) Field of Classification Search
CPC ...... G06T 7/12; H04N 19/176; H04N 19/105; H04N 19/159; H04N 19/70; H04N 19/167; H04N 19/174; G06V 20/635; G06V 30/10; G06V 10/50; G06V 20/62
See application file for complete search history.

(56) References Cited

FOREIGN PATENT DOCUMENTS

| | | | |
|---|---|---|---|
| CN | 111901606 | A | 11/2020 |
| CN | 116260968 | A | 6/2023 |
| CN | 116661935 | A | 8/2023 |

OTHER PUBLICATIONS

Aug. 25, 2024—(CN) First Search Report—App. No. 202311337438.4 w/English Translation.

* cited by examiner

METHOD AND APPARATUS FOR PROCESSING VIDEO CODING, ELECTRONIC DEVICE, AND STORAGE MEDIUM

CROSS-REFERENCE TO RELATED APPLICATION(S)

This application claims priority to Chinese Patent Application No. 202311337438.4 filed Oct. 16, 2023, the disclosure of which is incorporated herein by reference in its entirety.

TECHNICAL FIELD

The present disclosure relates to the field of computer technology, in particular, the field of image processing technology. Specifically, the present disclosure relates to a method and an apparatus for processing video coding, an electronic device, and a storage medium.

BACKGROUND

Among various online video scenes, videos with captions, such as movies, TV shows, and variety shows, account for a very high proportion. The captions contain the story outlines and key information of videos, making it easier for users to understand the video content. Therefore, during video playback, captions often belong to an area human eyes are more interested in. The quality of coding in this area greatly affects the visual experience of videos. Thus, in the video coding process, it is very important to improve the coding quality of the caption region.

SUMMARY

The present disclosure provides a method and an apparatus for processing video coding, an electronic device, and a storage medium.

According to an aspect of the present disclosure, a method for processing video coding is provided. The method includes steps described below.

According to domain image blocks of a target image block in a video frame, it is determined whether the target image block belongs to a candidate caption region.

In response to determining that the target image block belongs to the candidate caption region, a pixel histogram of the target image block is generated.

According to the pixel histogram of the target image block, the region type to which the target image block belongs is determined, where the region type is a caption region or a non-caption region.

According to the region type to which the target image block belongs, a target coding mode is determined for the target image block.

According to an aspect of the present disclosure, an apparatus for processing video coding is provided. The apparatus includes a candidate caption module, a histogram module, a region type module, and a coding mode module.

The candidate caption module is configured to determine, according to domain image blocks of a target image block in a video frame, whether the target image block belongs to a candidate caption region.

The histogram module is configured to generate a pixel histogram of the target image block in response to determining that the target image block belongs to the candidate caption region.

The region type module is configured to determine the region type to which the target image block belongs according to the pixel histogram of the target image block, where the region type is a caption region or a non-caption region.

The coding mode module is configured to determine a target coding mode for the target image block according to the region type to which the target image block belongs.

According to another aspect of the present disclosure, an electronic device is provided.

The electronic device includes at least one processor and a memory.

The memory is communicatively connected to the at least one processor.

The memory stores instructions executable by the at least one processor. The instructions are executed by the at least one processor to cause the at least one processor to perform the method according to any embodiment of the present disclosure.

According to another aspect of the present disclosure, a non-transitory computer-readable storage medium is provided. The storage medium stores computer instructions configured to, when executed by a computer, cause the computer to perform the method according to any embodiment of the present disclosure.

According to another aspect of the present disclosure, a computer program product is provided. The computer program product includes a computer program that, when executed by a processor, performs the method according to any embodiment of the present disclosure.

It is to be understood that the content described in this section is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solutions and not to limit the present disclosure. In the drawings.

DETAILED DESCRIPTION

Figure 1:
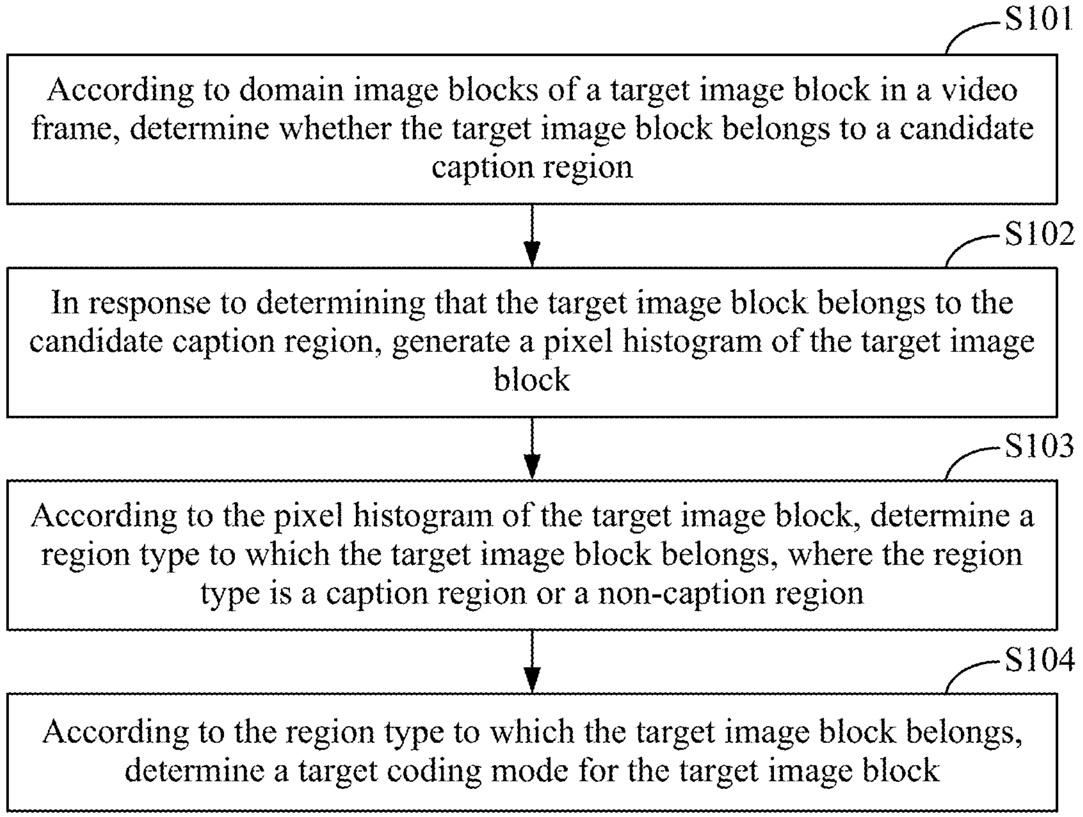
FIG. 1 is a flowchart of a method for processing video coding according to an embodiment of the present disclosure.

FIG. 1 is a flowchart of a method for processing video coding according to an embodiment of the present disclosure. The method is applicable to optimize the coding of video frames containing captions. The method may be performed by an apparatus for processing video coding. The apparatus may be implemented by software and/or hardware and may be integrated into an electronic device. As shown in FIG. 1, the method for processing video coding in this embodiment may include steps described below.

In S101, according to domain image blocks of a target image block in a video frame, whether the target image block belongs to a candidate caption region is determined.

In S102, in response to determining that the target image block belongs to the candidate caption region, a pixel histogram of the target image block is generated.

In S103, according to the pixel histogram of the target image block, a region type to which the target image block belongs is determined, where the region type is a caption region or a non-caption region.

In S104, according to the region type to which the target image block belongs, a target coding mode is determined for the target image block.

In the related coding technology for a caption region, the caption region in a video frame is determined based on the variance of image blocks or time domain continuity of the image blocks, which causes many non-caption regions are divided as caption regions, resulting in more false caption region detections. According to the embodiments of the present disclosure, by obtaining the pixel variance average value of the target image block based on the domain image blocks, generating a pixel histogram of the target image block, and determining, according to the pixel variance average value and the pixel histogram, whether the target image block belongs to the caption region, the accuracy of the caption region detection is improved. Subsequently, the target image block is encoded according to the region type to which the target image block belongs. In this manner, the coding quality of the caption region is further improved while the coding efficiency and subjective quality of the video frame are improved as well, avoiding a waste of the bit rate.

In the embodiments of the present disclosure, based on HEVC (High Efficiency Video Coding), the video frame is divided into multiple non-overlapping image blocks, and each of the image blocks has the same size. The target image block is an image block to be encoded. For the target image block in the video frame, domain image blocks of the target image block may be acquired. For example, image blocks adjacent to the upper, lower, left, and right sides of the target image block may be taken as domain image blocks. Pixels in the domain image blocks are used to determine whether the target image block belongs to a candidate caption region. In response to determining that the target image block belongs to the candidate caption region, a pixel histogram of the target image block is further generated, and it is determined, according to the pixel histogram of the target image block, the target image block belongs to a caption region or a non-caption region.

That is, a preliminary screening is performed on the target image block according to the domain image blocks, to determine whether the target image block belongs to the caption region. In response to determining that the target image block belongs to the caption region, the target image block is taken as the candidate caption region; a pixel histogram of the target image block is generated, and it is further determined, according to the pixel histogram, whether the target image block belongs to the caption region. By the combination of the domain image blocks and the pixel histogram of the target image block, it is determined whether the target image block belongs to the caption region. Compared with the related art where the caption region is determined only using the variance and time domain continuity of the image blocks, according to the method in the embodiments of the present invention, the screening accuracy of the caption region can be improved, which provides foundation for determining a target coding mode for the target image block according to the region type to which the target image block belongs. It should be noted that in response to determining that the target image block does not belong to the candidate caption region, that is, the target image block is not screened-out in the preliminary screening, it is determined that the region type to which the target image block belongs is a non-caption region.

According to the technical solutions provided by the embodiments of the present disclosure, the pixel variance average value of the target image block is obtained based on the domain image blocks, a pixel histogram of the target image block is generated, and in combination of the pixel variance average value and the pixel histogram, it is determined whether the target image block belongs to the caption region, improving the screening accuracy of the caption region and laying the foundation for determining a target coding mode for the target image block according to the region type.

Figure 2:
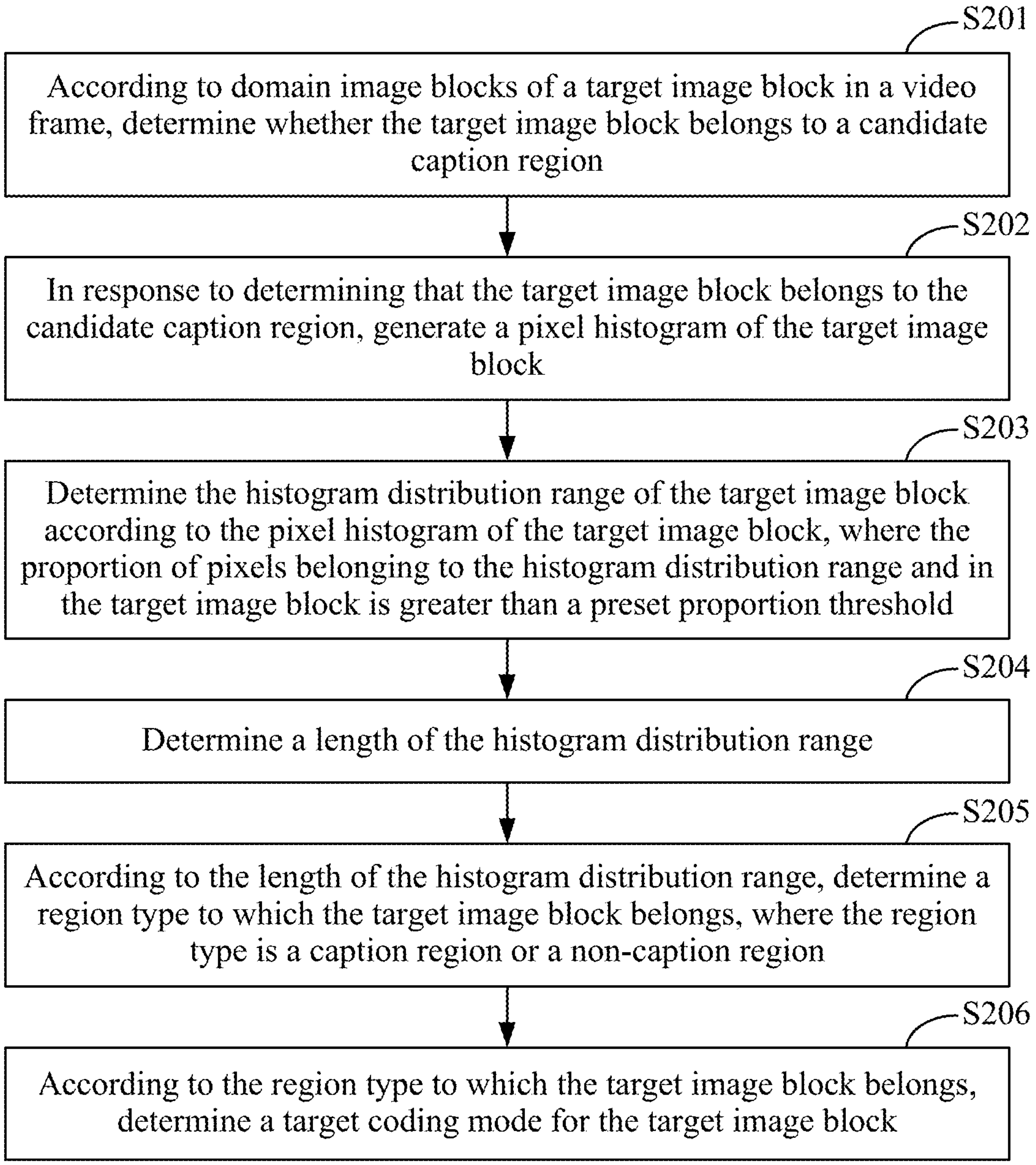
FIG. 2 is another flowchart of the method for processing video coding according to an embodiment of the present disclosure.

FIG. 2 is another flowchart of the method for processing video coding according to an embodiment of the present disclosure. With reference to FIG. 2, the method for processing video coding in this embodiment may include steps S201-S206 described below.

In S201, according to domain image blocks of a target image block in a video frame, whether the target image block belongs to a candidate caption region is determined.

In S202, in response to determining that the target image block belongs to the candidate caption region, a pixel histogram of the target image block is generated.

In S203, the histogram distribution range of the target image block is determined according to the pixel histogram of the target image block, where the proportion of pixels belonging to the histogram distribution range and in the target image block is greater than a preset proportion threshold.

In S204, a length of the histogram distribution range is determined.

In S205, according to the length of the histogram distribution range, a region type to which the target image block belongs is determined, where the region type is a caption region or a non-caption region.

In S206, according to the region type to which the target image block belongs, a target coding mode is determined for the target image block.

The horizontal axis of the pixel histogram represents pixel values, and from left to right along the horizontal axis, the pixel values go from low to high. The vertical axis of the pixel histogram represents the number of pixels, and from bottom to top along the vertical axis, the number of pixels go from small to large. The higher the bulge of the pixel histogram is in a certain pixel range, the more pixels there are in this pixel range. The proportion threshold may be a preset empirical value. For example, the proportion value may be 80%. Specifically, the pixel number in the pixel histogram of the target image block is counted, and the pixel range where more than 80% of the pixels are concentrated is obtained as the histogram distribution range; the length of the histogram distribution range is determined; and according to the length of the histogram distribution range, whether the target image block belongs to the caption region is determined. Whether the target image block belongs to the caption region is determined using the block-level pixel histogram, which make full use of the characteristic of pixel concentration of the caption scene. Thus, the accuracy of screening the caption region can be further improved.

Optionally, determining the region type to which the target image block belongs according to the length of the histogram distribution range includes: in response to that the length of the histogram distribution range is less than a preset length threshold, determining that the region type to which the target image block belongs is the caption region; and in response to that the length of the histogram distribution range is equal to or greater than a preset length threshold, determining that the region type to which the target image block belongs is the non-caption region.

The preset length threshold may be an empirical value. For example, the length threshold may be 30. In response to that the length of the histogram distribution range of the target image block is less than the preset length threshold, it is determined that the target image block belongs to the caption region; and in response to that the length of the histogram distribution range is equal to or greater than a preset length threshold, it is determined that the target image block belongs to the non-caption region. Pixels corresponding to a natural scene are discrete, while pixels corresponding to a caption scene are relatively centralized. For example, pixels of the caption region may be concentrated between 220 and 240. Based on the characteristic of pixel concentration in the caption region, the length of the histogram distribution range of the target image block is determined, and it is determined that a target image block whose length is less than a length threshold belongs to the caption region. Thus, the accuracy of screening-out the caption region can be improved.

According to the technical solutions provided by the embodiments of the present disclosure, for the candidate caption region in the video frame, a pixel histogram of the candidate caption region is generated, the length of the histogram distribution range is determined according to the pixel histogram, and it is determined whether the candidate caption region belongs to the caption region according to the length of the histogram distribution range. Therefore, the characteristic of pixel concentration in the caption region can be fully utilized to improve the accuracy of screening the caption region and lay the foundation for subsequent coding optimization of the target image block according to the region type.

Optionally, determining whether the target image block belongs to the candidate caption region according to the domain image blocks of the target image block includes: determining pixel variances of the domain image blocks respectively; averaging the pixel variances to obtain a pixel variance average value of the target image block; and in response to that the pixel variance average value of the target image block is greater than a preset variance threshold, taking the target image block as a candidate caption region.

The variance threshold may be an empirical value. For each target image block in the video frame, domain image blocks of the target image block may be acquired, and pixel variances of the domain image blocks are respectively determined; the pixel variances are averaged to obtain the pixel variance average value of the target image block. In response to that the pixel variance average value of the target image block is greater than a variance threshold, the target image block is taken as the candidate caption region. In response to that the pixel variance average value of the target image block is equal to or less than a variance threshold, the target image block is taken as a non-caption region. In combination with the variance threshold, an image block with a relatively large pixel variance average value is determined as a candidate caption image block, and an image block with a relatively small pixel variance average value is directly taken as a non-caption region. By using the aforementioned preliminary screening, the number of candidate caption image blocks can be reduced, reducing the amount of calculation for subsequently determining the caption region using the pixel histogram and improving the efficiency and accuracy of determining the caption region.

Figure 3A:
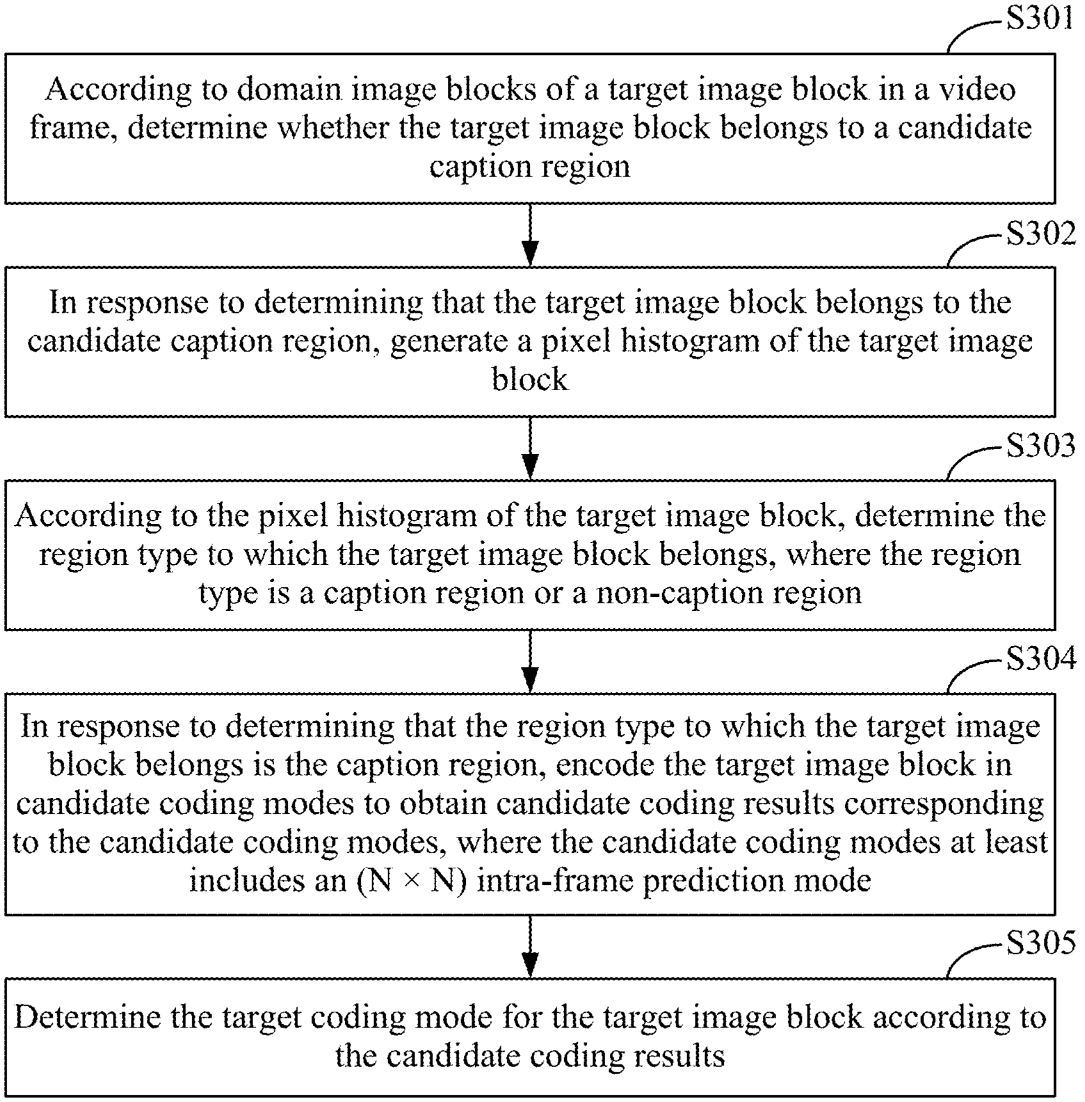
FIG. 3A is yet another flowchart of the method for processing video coding according to an embodiment of the present disclosure.

FIG. 3A is yet another flowchart of the method for processing video coding according to an embodiment of the present disclosure. With reference to FIG. 3A, the method for processing video coding in this embodiment may include steps described below.

In S301, according to domain image blocks of a target image block in a video frame, whether the target image block belongs to a candidate caption region is determined.

In S302, in response to determining that the target image block belongs to the candidate caption region, a pixel histogram of the target image block is generated.

In S303, according to the pixel histogram of the target image block, the region type to which the target image block belongs is determined, where the region type is a caption region or a non-caption region.

In S304, in response to determining that the region type to which the target image block belongs is the caption region, the target image block is encoded in candidate coding modes to obtain candidate coding results corresponding to the candidate coding modes, where the candidate coding modes at least includes an (N×N) intra-frame prediction mode.

In S305, the target coding mode is determined from the candidate coding modes for the target image block according to the candidate coding results.

The embodiments of the present disclosure provide an optimization method for HEVC for the caption region in a video frame. Based on HEVC, the intra-frame prediction and inter-frame prediction may be performed on the target image block to remove spatiotemporal redundant information to obtain a predicted image block. In related intra-frame predictions, prediction may be performed on the target image block in different directions according to the size of the target image block. In an (N×N) intra-frame prediction mode, where N is a positive integer, fine-grained division are performed on the target image block to obtain image sub-blocks of the target image block and prediction may be performed on the image sub-blocks in different directions. That is to say, in the (N×N) intra-frame prediction mode, prediction is performed in a finer granularity with higher complexity than that in the related intra-frame prediction.

In response to determining that the target image block belongs to the caption region, the (N×N) intra-frame prediction mode is joined to the candidate coding modes. That is, the candidate coding modes for the caption region may include the (N×N) intra-frame prediction mode, intra-frame prediction modes other than the (N×N) intra-frame prediction mode, and an inter-frame prediction mode. The target image block is encoded in each of the candidate coding modes separately to obtain candidate coding results corresponding to the candidate coding modes. A candidate coding mode among the candidate coding modes with better coding quality is determined as the target coding mode for the target image block. The coding quality may be obtained through subjective evaluation and objective evaluation. The Subjective evaluation strives to truly reflect human visual perception. The objective evaluation objectively represents the image distortion before and after coding using a mathematical model. For the caption region in the video frame, the (N×N) intra-frame prediction mode is used as a candidate coding mode, and fine-grained coding is performed on the caption region to obtain a candidate coding result corresponding to the (N×N) intra-frame prediction mode. The candidate coding result corresponding to the (N×N) intra-frame prediction mode is compared with the candidate coding results corresponding to other candidate prediction modes, and a candidate coding mode with better coding quality is determined as the target coding mode. A fine-grained (N×N) intra-frame prediction mode is joined to process a caption region with relatively complex texture so that the adaptability between the target coding mode and the caption region can be further improved, improving the quality of subsequent coding of the caption region using the target coding mode.

Optionally, in response to determining that the region type to which the target image block belongs is the non-caption region, it is determined whether the target image block meets a skip condition for the (N×N) intra-frame prediction mode according to the target image block and the domain image blocks. In response to determining that the target image block meets the skip condition for the (N×N) intra-frame prediction mode, the (N×N) intra-frame prediction mode is removed from the candidate coding modes; the target image block is encoded in remaining candidate coding modes to obtain candidate coding results corresponding to the remaining candidate coding modes; and the target coding mode is determined for the target image block according to the candidate coding results corresponding to the remaining candidate coding modes.

In response to determining that the target image block belongs to the non-caption region, it is determined whether the target image block meets a skip condition for an (N×N) intra-frame prediction mode according to the target image block and the domain image blocks. The pixel variances of the target image block and the domain image blocks may be used to determine the complexity of the target image block. If the complexity is relatively low, the skip condition for the (N×N) intra-frame prediction mode is met; otherwise, the skip condition for the (N×N) intra-frame prediction mode is not met. In response to determining that the skip condition for the (N×N) intra-frame prediction mode is met, the (N×N) intra-frame prediction mode is not retained in the candidate coding modes. Intra-frame prediction modes other than the (N×N) intra-frame prediction mode and inter-frame prediction modes are used as candidate coding modes for the non-caption region. For the non-caption region, a fast algorithm is used to determine whether to skip the (N×N) intra-frame prediction mode so that the processing efficiency of the non-caption region can be improved.

Optionally, in response to determining that the target image block does not meet the skip condition for the (N×N) intra-frame prediction mode, the (N×N) intra-frame prediction mode is retained in the candidate coding modes.

For a non-caption region, only when the skip condition for the (N×N) intra-frame prediction mode is not met, the (N×N) intra-frame prediction mode is retained in the candidate coding modes, that is, in this case, the (N×N) intra-frame prediction mode is used as one candidate coding mode, and a dynamic balance can be maintained between the coding efficiency and coding quality of the non-caption region.

In the technical solutions provided by the embodiments of the present disclosure, for a caption region, a fine-grained (N×N) intra-frame prediction mode is joined to process a caption region with relatively complex texture so that the adaptability between the target coding mode and the caption region can be further improved, improving the quality of subsequent coding of the caption region by using the target coding mode; for a non-caption region, the (N×N) intra-frame prediction mode is retained in the candidate coding modes only when the target image block does not meet the skip condition for the (N×N) intra-frame prediction mode, and a dynamic balance can be maintained between the coding efficiency and coding quality of the non-caption region.

Optionally, after determining the target coding mode for the target image block, the method also includes that: in response to determining that the region type to which the target image block belongs is the caption region, a quantization parameter of the target image block is adjusted by reducing the quantization parameter by a first offset; in response to determining that the region type to which the target image block belongs is the non-caption region, the quantization parameter of the target image block is adjusted by increasing the quantization parameter by a second offset, where the first offset is greater than the second offset; and based on the target coding mode, the target image block is encoded using the adjusted quantization parameter.

For the caption region, the quantization parameter of the target image block may be adjusted by reducing the quantization parameter by the first offset through the following formula:

$$QP_1=QP-QP\_Offset_1.$$

In the formula, QP, $QP_1$, and $QP\_Offset_1$ are the original quantization parameter, the adjusted quantization parameter, and the first offset of the target image block, respectively.

For the non-caption region, the quantization parameter of the target image block may be adjusted by increasing the quantization parameter by the second offset through the following formula:

$$QP_2=QP-QP\_Offset_2.$$

In the formula, QP, $QP_2$, and $QP\_Offset_2$ are the original quantization parameter, the adjusted quantization parameter, and the second offset of the target image block, respectively; where the first offset and the second offset are both positive values, and $QP\_Offset_2$ is greater than $QP\_Offset_1$.

The quantization parameter (QP) is used to control the bit rate and coding distortion. The larger the value of the quantization parameter, the greater the distortion and the lower the bit rate. The quantization parameter is reduced for the caption region to improve the bit rate, and the quantization parameter is increased for the non-caption region to reduce the bit rate. While the bit rate of the caption region is increased, the bit rate of the non-caption region to which human eyes are not sensitive is reduced so that the overall bit rate of the video frame can be kept as low as possible, improving the coding quality of the video frame without increasing the overall bit rate as much as possible.

Figure 3B:
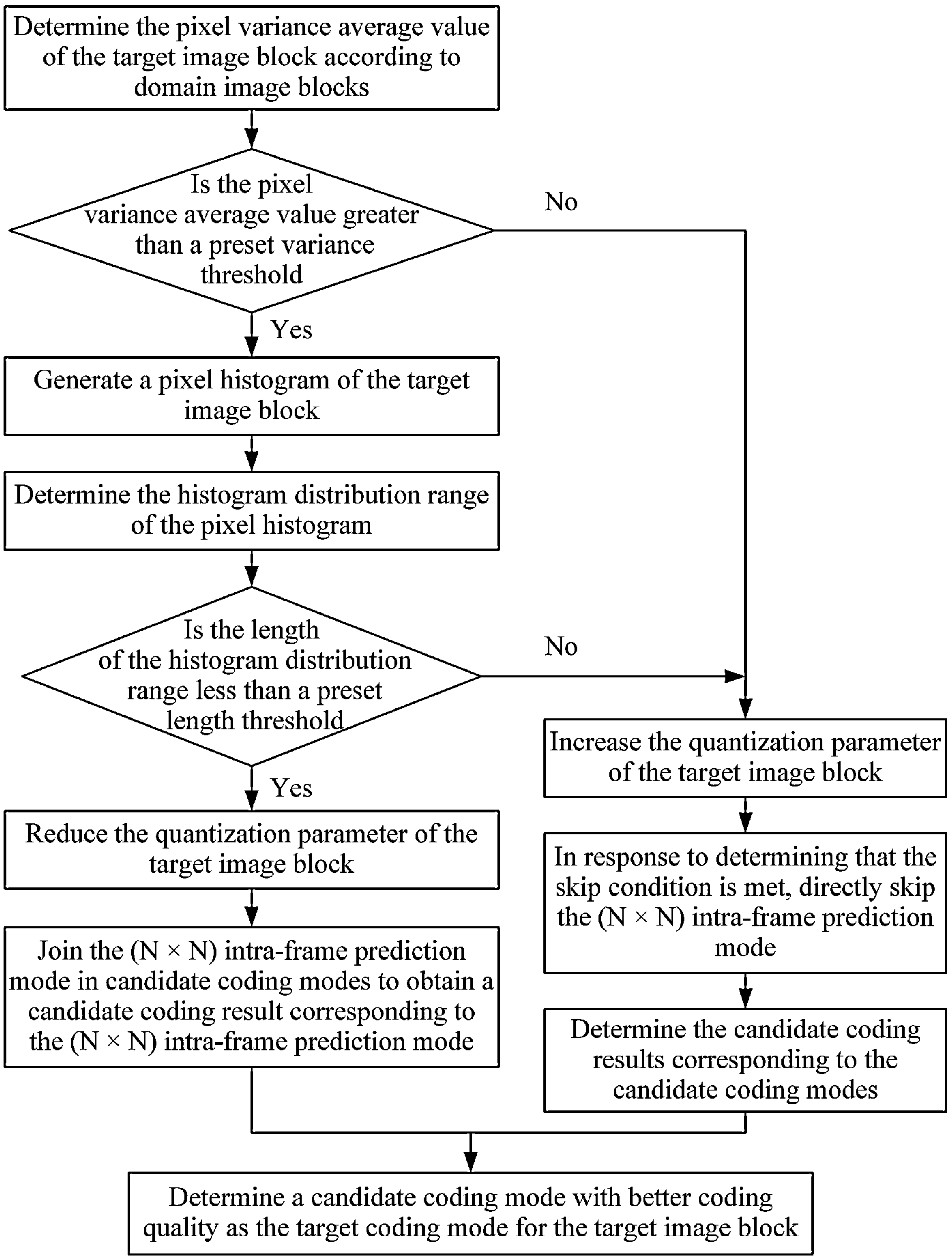
FIG. 3B is yet another flowchart of the method for processing video coding according to an embodiment of the present disclosure.

FIG. 3B is yet another flowchart of the method for processing video coding according to an embodiment of the present disclosure. With reference to FIG. 3B, for a target image block in a video frame, the pixel variance average value of the target image block may be determined according to domain image blocks. It is determined whether the pixel variance average value of the target image block is greater than a preset variance threshold. When the pixel variance average value of the target image block is greater than the preset variance threshold, it is determined that the target image block belongs to a candidate caption region, and a pixel histogram of the target image block is generated. The histogram distribution range of the pixel histogram is determined, and it is determined whether the length of the histogram distribution range is less than a preset length threshold. When the length of the histogram distribution range is less than the preset length threshold, it is determined that the target image block belongs to the caption region; otherwise, it is determined that the target image block belongs to the non-caption region. It should be noted that when the pixel variance average value of the target image block is equal to or less than the preset variance threshold, it is determined that the target image block belongs to the non-caption region.

In response to determining that the target image block belongs to the caption region, the quantization parameter of the target image block is reduced, and the (N×N) intra-frame prediction mode is joined in the candidate coding modes. The target image block is encoded in each of the candidate coding modes to obtain a candidate coding result corresponding to each of the candidate coding modes. The candidate coding mode with better coding quality is determined as the target coding mode for the target image block. In response to determining that the target image block is a non-caption region, the quantization parameter of the target image block is increased, and whether the skip condition for the (N×N) intra-frame prediction mode is met is determined. In response to determining that the skip condition for the (N×N) intra-frame prediction mode is met, the (N×N) intra-frame prediction mode is directly skipped. In response to determining that the (N×N) intra-frame prediction mode is not met, the (N×N) intra-frame prediction mode is used as one of the candidate coding modes. The target image block is encoded in each of the candidate coding modes to obtain a candidate coding result corresponding to each of the candidate coding modes, and the target coding mode is determined from the candidate coding modes according to the candidate coding results. Subsequently, the target image block is encoded in the target coding mode.

Figure 4:
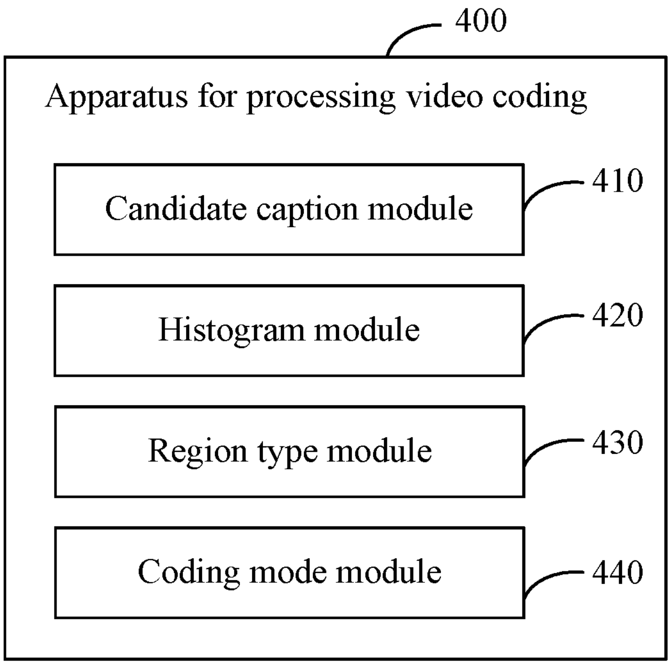
FIG. 4 is a diagram illustrating the structure of an apparatus for processing video coding according to an embodiment of the present disclosure.

FIG. 4 is a diagram illustrating the structure of an apparatus for processing video coding according to an embodiment of the present disclosure, which is applicable to a situation where the coding of video frames containing captions is optimized. The apparatus may be implemented in software and/or hardware. As shown in FIG. 4, the apparatus for processing video coding 400 in this embodiment may include a candidate caption module 410, a histogram module 420, a region type module 430, and a coding mode module 440.

The candidate caption module 410 is configured to determine, according to domain image blocks of a target image block in a video frame, whether the target image block belongs to a candidate caption region.

The histogram module 420 is configured to, in response to determining that the target image block belongs to the candidate caption region, generate a pixel histogram of the target image block.

The region type module 430 is configured to determine the region type to which the target image block belongs according to the pixel histogram of the target image block, where the region type is a caption region or a non-caption region.

The coding mode module 440 is configured to determine a target coding mode for the target image block according to the region type to which the target image block belongs.

Optionally, the region type module 430 includes a distribution range unit, a distribution length unit, and a region type unit.

The distribution range unit is configured to determine the histogram distribution range of the target image block according to the pixel histogram of the target image block, where the proportion of pixels belonging to the histogram distribution range and in the target image block is greater than a preset proportion threshold.

The distribution length unit is configured to determine the length of the histogram distribution range.

The region type unit is configured to determine the region type to which the target image block belongs according to the length of the histogram distribution range.

Optionally, the region type unit includes a caption subunit and a non-caption subunit.

The caption subunit is configured to, in response to determining that the length of the histogram distribution range is less than a preset length threshold, determine that the region type to which the target image block belongs is the caption region.

The non-caption subunit is configured to, in response to determining that the length of the histogram distribution range is equal to or greater than a preset length threshold, determine that the region type to which the target image block belongs is the non-caption region.

Optionally, the candidate caption module 410 includes a pixel variance unit, a variance average unit, and a candidate caption unit.

The pixel variance unit is configured to respectively determine pixel variances of the domain image blocks.

The variance average unit is configured to average the pixel variances to obtain the pixel variance average value of the target image block.

The candidate caption unit is configured to, in response to determining that the pixel variance average value of the target image block is greater than a preset variance threshold, take the target image block as the candidate caption region.

Optionally, the coding mode module 440 includes a first coding unit and a first mode unit.

The first coding unit is configured to, in response to determining that the region type to which the target image block belongs is the caption region, encode the target image block in candidate coding modes to obtain candidate coding results corresponding to the candidate coding modes, where the candidate coding modes at least includes an (N×N) intra-frame prediction mode.

The first mode unit is configured to determine the target coding mode from the candidate coding modes for the target image block according to the candidate coding results.

Optionally, the coding mode module 440 includes a skip condition unit, a removal unit, a second coding unit, and a second mode unit.

The skip condition unit configured to, in response to determining that the region type to which the target image block belongs is the non-caption region, determine whether the target image block meets a skip condition for the (N×N) intra-frame prediction mode according to the target image block and the domain image blocks.

The removal unit is configured to, in response to determining that the target image block meets the skip condition for the (N×N) intra-frame prediction mode, remove the (N×N) intra-frame prediction mode from the candidate coding modes.

The second coding unit is configured to, encode the target image block in remaining candidate coding modes to obtain candidate coding results corresponding to the remaining candidate coding modes.

The second mode unit is configured to determine the target coding mode for the target image block according to the candidate coding results corresponding to the remaining candidate coding modes.

Optionally, the coding mode module 440 also includes a retaining unit.

The retaining unit is configured to, in response to determining that the target image block does not meet the skip condition for the (N×N) intra-frame prediction mode, retain the (N×N) intra-frame prediction mode in the candidate coding modes.

Optionally, the apparatus for processing video coding 400 also includes an image coding module. The image coding module includes a first quantization parameter unit, a second quantization parameter unit, and an image coding unit.

The first quantization parameter unit is configured to, in response to determining that the region type to which the target image block belongs is the caption region, adjust a quantization parameter of the target image block by reducing the quantization parameter by a first offset.

The second quantization parameter unit is configured to, in response to determining that the region type to which the target image block belongs is the non-caption region, adjust the quantization parameter of the target image block by increasing by a second offset, where the first offset is greater than the second offset.

The image coding unit is configured to encode, based on the target coding mode, the target image block using the adjusted quantization parameter.

In the technical solutions of the embodiments of the present disclosure, the pixel variance average value of the target image block is obtained using the domain image blocks, a pixel histogram of the target image block is generated, and with reference to the pixel variance average value and the pixel histogram, it is determined whether the target image block belongs to the caption region, improving the accuracy of the caption region. Moreover, the increase of the bit rate and the optimization of the coding mode of the caption region can improve the coding quality of the caption region. The reduction of the bit rate of the non-caption region can ensure the coding efficiency and subjective quality of the video frame.

Operations, including acquisition, storage, and application, on a user's personal information involved in the solutions of the present disclosure conform to relevant laws and regulations and do not violate the public policy doctrine.

According to an embodiment of the present disclosure, the present disclosure also provides an electronic device, a readable storage medium, and a computer program product.

Figure 5:
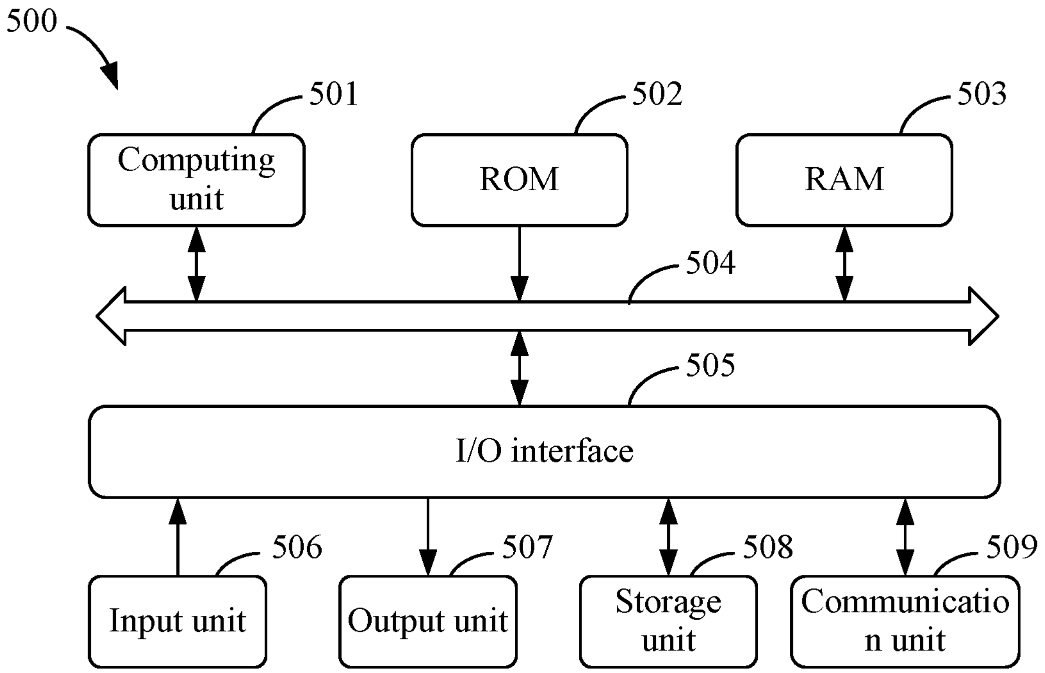
FIG. 5 is a block diagram of an electronic device for implementing the method for processing video coding according to an embodiment of the present disclosure.

FIG. 5 is a block diagram of an electronic device for implementing the method for processing video coding according to an embodiment of the present disclosure.

FIG. 5 is a block diagram illustrating an exemplary electronic device 500 that may be configured to perform the embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 5, the electronic device 500 includes a computing unit 501. The computing unit 501 may perform various types of appropriate operations and processing based on a computer program stored in a read-only memory (ROM) 502 or a computer program loaded from a storage unit 508 to a random-access memory (RAM) 503. Various programs and data required for the operation of the electronic device 500 may also be stored in the RAM 503. The computing unit 501, the ROM 502, and the RAM 503 are connected to each other by a bus 504. An input/output (I/O) interface 505 is also connected to the bus 504.

Multiple components in the electronic device 500 are connected to the I/O interface 505. The multiple components include an input unit 506 such as a keyboard and a mouse, an output unit 507 such as various types of displays and speakers, the storage unit 508 such as a magnetic disk and an optical disk, and a communication unit 509 such as a network card, a modem, and a wireless communication transceiver. The communication unit 509 allows the electronic device 500 to exchange information/data with other devices over a computer network such as the Internet and/or various telecommunications networks.

The computing unit 501 may be various general-purpose and/or special-purpose processing components having processing and computing capabilities. Examples of the computing unit 501 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller, and microcontroller. The computing unit 501 executes various methods and processing described above, such as the method for processing video coding. For example, in some embodiments, the method for processing video coding may be implemented as computer software programs tangibly contained in a machine-readable medium such as the storage unit 508. In some embodiments, part or all of computer programs may be loaded and/or installed on the electronic device 500 via the ROM 502 and/or the communication unit 509. When the computer program is loaded to the RAM 503 and executed by the computing unit 501, one or more steps of the preceding method for processing video coding may be performed. Alternatively, in other embodiments, the computing unit 501 may be configured, in any other suitable manner (for example, by means of firmware), to execute the method for processing video coding.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs may be executable and/or interpretable on a programmable system including at least one programmable processor. The programmable processor may be a special-purpose or general-purpose programmable processor for receiving data and instructions from a memory system, at least one input apparatus, and at least one output apparatus and transmitting the data and instructions to the memory system, the at least one input apparatus, and the at least one output apparatus.

Program codes for implementation of the methods of the present disclosure may be written in one programming language or any combination of multiple programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware, or front-end components. Components of a system may be interconnected by any form or medium of digital data communication (for example, a communication network). Examples of the communication network include a local area network (LAN), a wide area network (WAN), and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, a server of a distributed system, or a server combined with a blockchain.

Artificial intelligence is the study of making computers simulate certain human thinking processes and intelligent behaviors (such as learning, reasoning, thinking, and planning) both at the hardware and software levels. Artificial intelligence hardware technology generally includes, for example, sensors, special-purpose artificial intelligence chips, cloud computing, distributed storage, and big data processing. Artificial intelligence software technology mainly includes several major directions including computer vision technology, speech recognition technology, natural language processing technology, machine learning/deep learning technology, big data processing technology, and knowledge mapping technology.

Cloud computing refers to a technical system that accesses a shared elastic-and-scalable physical or virtual resource pool through a network, where resources may include servers, operating systems, networks, software, applications, and storage devices and may be deployed and managed in an on-demand, self-service manner by cloud computing. Cloud computing can provide efficient and powerful data processing capabilities for artificial intelligence, the blockchain and other technical applications and model training.

It is to be understood that various forms of the preceding flows may be used with steps reordered, added, or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A method for processing video coding, comprising:

determining, according to domain image blocks of a target image block in a video frame, whether the target image block belongs to a candidate caption region;

in response to determining that the target image block belongs to the candidate caption region, generating a pixel histogram of the target image block;

determining, according to the pixel histogram of the target image block, a region type to which the target image block belongs, wherein the region type is a caption region or a non-caption region; and determining, according to the region type to which the target image block belongs, a target coding mode for the target image block;

wherein determining, according to the pixel histogram of the target image block, the region type to which the target image block belongs comprises:

determining a histogram distribution range of the target image block according to the pixel histogram of the target image block, wherein a proportion of pixels belonging to the histogram distribution range and in the target image block is greater than a preset proportion threshold;

determining a length of the histogram distribution range; and determining, according to the length of the histogram distribution range, the region type to which the target image block belongs; and wherein determining, according to the length of the histogram distribution range, the region type to which the target image block belongs comprises:

in response to determining that the length of the histogram distribution range is less than a preset length threshold, determining that the region type to which the target image block belongs is the caption region; and in response to determining that the length of the histogram distribution range is equal to or greater than the preset length threshold, determining that the region type to which the target image block belongs is the non-caption region.

2. The method of claim 1, wherein determining, according to the domain image blocks of the target image block, whether the target image block belongs to the candidate caption region comprises:

determining pixel variances of the domain image blocks respectively;

averaging the pixel variances of the domain image blocks to obtain a pixel variance average value of the target image block; and in response to determining that the pixel variance average value of the target image block is greater than a preset variance threshold, taking the target image block as the candidate caption region.

3. The method of claim 1, wherein determining the target coding mode for the target image block according to the region type to which the target image block belongs comprises:

in response to determining that the region type to which the target image block belongs is the caption region, encoding the target image block in candidate coding modes to obtain candidate coding results corresponding to the candidate coding modes; wherein the candidate coding modes at least comprise an (N×N) intra-frame prediction mode; and determining the target coding mode from the candidate coding modes for the target image block according to the candidate coding results.

4. The method of claim 3, wherein determining, according to the region type to which the target image block belongs, the target coding mode for the target image block comprises:

in response to determining that the region type to which the target image block belongs is the non-caption region, determining, according to the target image block and the domain image blocks, whether the target image block meets a skip condition for the (N×N) intra-frame prediction mode;

in response to determining that the target image block meets the skip condition for the (N×N) intra-frame prediction mode, removing the (N×N) intra-frame prediction mode from the candidate coding modes;

encoding the target image block in remaining candidate coding modes to obtain candidate coding results corresponding to the remaining candidate coding modes; and determining the target coding mode for the target image block according to the candidate coding results corresponding to the remaining candidate coding modes.

5. The method of claim 4, further comprising:

in response to determining that the target image block does not meet the skip condition for the (N×N) intra-frame prediction mode, retaining the (N×N) intra-frame prediction mode in the candidate coding modes.

6. The method of claim 1, wherein after determining the target coding mode for the target image block, the method further comprises:

in response to determining that the region type to which the target image block belongs is the caption region, adjusting a quantization parameter of the target image block by reducing the quantization parameter by a first offset;

in response to determining that the region type to which the target image block belongs is the non-caption region, adjusting the quantization parameter of the target image block by increasing the quantization parameter by a second offset, wherein the first offset is greater than the second offset; and encoding, based on the target coding mode, the target image block using the adjusted quantization parameter.

7. An electronic device, comprising:

at least one processor; and a memory communicatively connected to the at least one processor;

wherein the memory stores instructions executable by the at least one processor, and the instructions are executed by the at least one processor to cause the at least one processor to perform the following:

determining, according to domain image blocks of a target image block in a video frame, whether the target image block belongs to a candidate caption region;

in response to determining that the target image block belongs to the candidate caption region, generating a pixel histogram of the target image block;

determining, according to the pixel histogram of the target image block, a region type to which the target image block belongs; wherein the region type is a caption region or a non-caption region; and determining, according to the region type to which the target image block belongs, a target coding mode for the target image block;

wherein determining, according to the pixel histogram of the target image block, the region type to which the target image block belongs comprises:

determining a histogram distribution range of the target image block according to the pixel histogram of the target image block, wherein a proportion of pixels belonging to the histogram distribution range and in the target image block is greater than a preset proportion threshold;

determining a length of the histogram distribution range; and determining, according to the length of the histogram distribution range, the region type to which the target image block belongs; and wherein determining, according to the length of the histogram distribution range, the region type to which the target image block belongs comprises:

in response to determining that the length of the histogram distribution range is less than a preset length threshold, determining that the region type to which the target image block belongs is the caption region; and in response to determining that the length of the histogram distribution range is equal to or greater than the preset length threshold, determining that the region type to which the target image block belongs is the non-caption region.

8. The electronic device of claim 7, wherein the instructions are executed by the at least one processor to cause the at least one processor to perform the following:
- determining pixel variances of the domain image blocks respectively;
- averaging the pixel variances to obtain a pixel variance average value of the target image block; and
- in response to determining that the pixel variance average value of the target image block is greater than a preset variance threshold, taking the target image block as the candidate caption region.

9. The electronic device of claim 7, wherein the instructions are executed by the at least one processor to cause the at least one processor to perform the following:
- in response to determining that the region type to which the target image block belongs is the caption region, encoding the target image block in candidate coding modes to obtain candidate coding results corresponding to the candidate coding modes, wherein the candidate coding modes at least comprise an (N×N) intra-frame prediction mode; and
- determining the target coding mode from the candidate coding modes for the target image block according to the candidate coding results.

10. The electronic device of claim 9, wherein the instructions are executed by the at least one processor to cause the at least one processor to perform the following:
- in response to determining that the region type to which the target image block belongs is the non-caption region, determining whether the target image block meets a skip condition for the (N×N) intra-frame prediction mode according to the target image block and the domain image blocks;
- in response to determining that the target image block meets the skip condition for the (N×N) intra-frame prediction mode, removing the (N×N) intra-frame prediction mode from the candidate coding modes;
- encoding the target image block in remaining candidate coding modes to obtain candidate coding results corresponding to the remaining candidate coding modes; and
- determining the target coding mode for the target image block according to the candidate coding results corresponding to the remaining candidate coding modes.

11. The electronic device of claim 10, wherein the instructions are executed by the at least one processor to cause the at least one processor to perform the following:
- in response to determining that the target image block does not meet the skip condition for the (N×N) intra-frame prediction mode, retaining the (N×N) intra-frame prediction mode in the candidate coding modes.

12. The electronic device of claim 7, wherein the instructions are executed by the at least one processor to cause the at least one processor to perform the following:
- in response to determining that the region type to which the target image block belongs is the caption region, adjusting a quantization parameter of the target image block by reducing the quantization parameter by a first offset;
- in response to determining that the region type to which the target image block belongs is the non-caption region, adjusting the quantization parameter of the target image block by increasing the quantization parameter by a second offset, wherein the first offset is greater than the second offset; and
- encode, based on the target coding mode, the target image block using the adjusted quantization parameter.

13. A non-transitory computer-readable storage medium storing computer instructions, wherein the computer instructions, when executed by a computer, cause the computer to perform:
- determining, according to domain image blocks of a target image block in a video frame, whether the target image block belongs to a candidate caption region;
- in response to determining that the target image block belongs to the candidate caption region, generating a pixel histogram of the target image block;
- determining, according to the pixel histogram of the target image block, a region type to which the target image block belongs; wherein the region type is a caption region or a non-caption region; and
- determining, according to the region type to which the target image block belongs, a target coding mode for the target image block;
- wherein determining, according to the pixel histogram of the target image block, the region type to which the target image block belongs comprises:
- determining a histogram distribution range of the target image block according to the pixel histogram of the target image block, wherein a proportion of pixels belonging to the histogram distribution range and in the target image block is greater than a preset proportion threshold;
- determining a length of the histogram distribution range; and
- determining, according to the length of the histogram distribution range, the region type to which the target image block belongs; and
- wherein determining, according to the length of the histogram distribution range, the region type to which the target image block belongs comprises:
- in response to determining that the length of the histogram distribution range is less than a preset length threshold, determining that the region type to which the target image block belongs is the caption region; and
- in response to determining that the length of the histogram distribution range is equal to or greater than the preset length threshold, determining that the region type to which the target image block belongs is the non-caption region.

14. The non-transitory computer-readable storage medium of claim 13, wherein the computer instructions, when executed by a computer, cause the computer to perform:
- determining pixel variances of the domain image blocks respectively;
- averaging the pixel variances to obtain a pixel variance average value of the target image block; and
- in response to determining that the pixel variance average value of the target image block is greater than a preset variance threshold, taking the target image block as the candidate caption region.

* * * * *